United States Patent
Perper

[15] 3,664,994

[45] May 23, 1972

[54] PROCESS FOR SEPARATING HORSE GAMMA GLOBULIN FRACTIONS BY CHROMATOGRAPHY

[72] Inventor: Robert J. Perper, Kalamazoo, Mich.

[73] Assignee: The Upjohn Company, Kalamazoo, Mich.

[22] Filed: June 30, 1969

[21] Appl. No.: 837,416

[52] U.S. Cl.............................260/112 B, 424/85, 424/177
[51] Int. Cl.................................................C07g 7/00
[58] Field of Search................................260/112 B

[56] References Cited

OTHER PUBLICATIONS

Proc. Soc. Experimental Biology and Medicine, Vol. 125, 1967, pp. 575–580 Perper et al.

Chem. Abstracts, Vol. 69, 1968, 42387m, Zhumashev et al.

*Primary Examiner*—Howard E. Schain
*Attorney*—Eugene O. Retter and Joseph K. Andonian

[57] ABSTRACT

Two gamma globulin fractions of differing chemical, immunological and biological characteristics are separated from an aqueous solution containing horse gamma globulin of anti-heterologous lymphocyte or lymphoblast origin by fractionation on an anion exchanger ether of cross-linked dextran.

3 Claims, 2 Drawing Figures

Patented May 23, 1972 3,664,994

CHARACTERISTIC ELUTION PATTERNS
OF FRACTION 1 AND FRACTION 2

CHARACTERISTIC IMMUNOELECTROPHORETIC PATTERNS
OF FRACTION 1 AND FRACTION 2

INVENTOR.
ROBERT J. PERPER
BY
Edward G. Jones
ATTORNEY

PROCESS FOR SEPARATING HORSE GAMMA GLOBULIN FRACTIONS BY CHROMATOGRAPHY

BACKGROUND OF THE INVENTION

Diethylaminoethyl "Sephadex" chromatography has been described as a technique of fractionating human serum proteins, Baumstark and Associates, Arch. Biochem. and Biophys. 108: 514–522 (1964). Modifications were used in the purification of gamma globulin from horse anti-goat lymphocyte serum, Perper and Associates, Proc. Soc. exptl. Biol. Med. 125: 575–580 (1967); and from horse anti-human lymphocyte serum, Konomi and Deodhar, Cleveland Clinic Quarterly, 35: 199–205 (October 1968). However, the desideratum of achieving a useful separation of biological characteristics in gamma globulin fractions was not realized. For example, evidence was lacking that a beneficial separation of gamma globulins had been achieved leading to concentrations of immunosuppressive and anti-inflammatory characteristics in comparison with unfractionated serum or gamma globulin. It is against this background that the present concept arose of fractionating horse anti-heterologous sera and plasma, e.g., horse anti-human lymphocyte sera and plasma under specialized chromatography conditions to obtain separated gamma globulin of differing physico-chemical, immunological and biological characteristics.

SUMMARY OF THE INVENTION

This invention relates to horse anti-lymphocyte gamma globulin. More specifically the concept is one of separating said globulin into fractions of differing characteristics by a chromatographic technique utilizing a specific anion exchanger and specific conditions of molarity and pH. The anion exchanger is the diethylaminoethyl ether of cross-linked dextran. The pH conditions vary within the range of about 7.2 to about 7.85 and the molarity within the range of about 0.01 M to about 0.05 M. The separated gamma globulins are useful for their immunosuppressive characteristics, for example in prolonging retention time of organ transplants and allografts in mammals, for example, humans and animals such as chimpanzees and rats and in anti-inflammatory applications in like subjects. Fraction 2 unexpectedly provides more anti-inflammatory action than does fraction 1.

DESCRIPTION OF PREFERRED EMBODIMENTS

Figure 1:
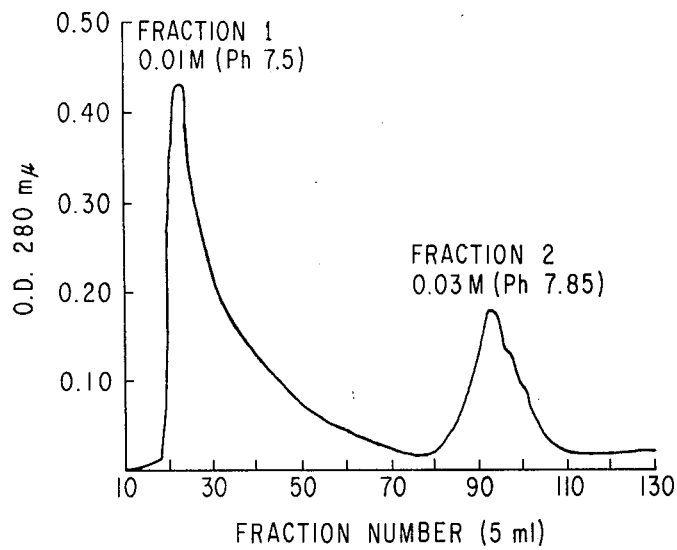
FIG. 1 shows the elution pattern of the respective fractions 1 and 2 obtained by the process of the invention.

In accordance with the manner and process of making and using the present invention, the starting material is an aqueous solution of gamma globulin of horse origin raised against heterologous lymphocytes. The term "heterologous" means a source other than horses, for example, human, sheep, swine, rabbit, and goat. Horse anti-human gamma globulin is preferred. The aqueous solution of immune gamma globulin is, for example, in the form of serum or plasma obtained from horses treated with human lymphocytes by methods known in the art, for example, Konomi and Deodhar, supra. The immune gamma globulin is also in the form of an aqueous solution of partially purified material, for example, from horse anti-dog and anti-human sources. Iwasaki et al. Surgery, Gynecology and Obstetrics 124: 1–24, January, 1967, or horse anti-human material Kasjewagi et al., Annals of Internal Medicine, 68: 275–286, February, 1968. For immunosuppressive action the latter used individual dosages to humans of 1 to 5 ml. of a solution containing 4.6 to 10.8 percent of total protein. The diethylaminoethyl ether of cross-linked dextran, also known as DEAE-Sephadex is available from Pharmacia Fine Chemicals, Inc. Piscataway, N.J., U.S.A. It is prepared by cross-linking dextran according to the methods of U.S. Pat. No. 3,002,823 wherein illustratively dextran is cross-linked with epichlorohydrin to yield a product containing ether bridges of the type $-O-CH_2CH(OH)CH_2-O-$. Water regain values and mequiv./gm. are described therein and by Per Flodin, Dextran Gels and Their Application, in Gel Filtration, Halmstad, 1962, Meijels Bokindustri, Sweden. A further disclosure is in U.S. Pat. No. 3,432,596. The diethylaminoethyl exchanger function is introduced into the cross-linked dextran according to the methods of U.S. Pat. No. 3,277,025 using diethylaminoethyl chloride or bromide. The method is based on those of Peterson and Sober, supra and McKernan and Richetts, Chem. and Industry, Nov. 21, 1959, pp. 1490, 1491. The preferred form of the ether of cross-linked dextran is that known as DEAE-Sephadex from Pharmacia, supra. It has a particle size of from about 50 to about 140 mesh, U.S. Standard. The total exchange capacity is about 3 to 4 milliequivalents per gm.

The preferred aqueous solution of gamma globulin is in the form of serum obtained in known manner from horses immunized with human lymphocytes or lymphocyte-like cells, for example with human spleen cells or thymus glands injected biweekly for four or five injections at 1 to $30^9$ cells per subcutaneous injection or from lymphoblasts (cultured human lymphocytes) at $1-20 \times 10^9$ lymphocytes per subcutaneous injection. Prior to chromatography, the serum is equilibrated by dialysis against aqueous phosphate buffer solution, 0.01 molar to 0.02 molar $Na_2HPO_4-NaH_2PO_4$, pH 7.5.

The manner and process of making and using the present invention is set forth in the following embodiments of the inventive concept.

COLUMN CHROMATOGRAPHY

DEAE-Sephadex, A-50 coarse, is allowed to swell and equilibrate with four changes of aqueous phosphate buffer, 0.01 molar $Na_2HPO_4-NaH_2PO_4$, pH 7.5 for 2 days. At this time the pH is 7.2 to 7.3. The equilibrated anion exchanger is packed into a column to a height of about 35 cm. with a diameter of about 3 cm. Horse anti-human lymphocyte serum which has been extensively dialyzed against the aqueous phosphate buffer, pH 7.5, is carefully layered on the bed of the anion exchanger under the phosphate layer. For about 10 ml. to about 25 ml. of the serum there are added stepwise (1) 300 ml. of the aqueous phosphate buffer, pH 7.5, (2) 500 ml. of another aqueous phosphate buffer, 0.03 molar $Na_2HPO_4-NaH_2PO_4$ pH 7.85, and (3) 500 ml. of another aqueous phosphate buffer, 0.05 molar $Na_2HPO_4-Na_2H_2PO_4$, pH 7.85. The ionic strength of the latter is finally increased by the stepwise addition of 0.02 molar sodium chloride solution and 0.2 molar sodium chloride solution respectively to clean out the column. The eluates are fractionally collected in accordance with absorbancies at 280 $\mu$, combinations of fractions of eluate are combined and concentrated to a final concentration of 10 mg. per ml. by ultra filtration. Serum from horses immunized with either human lymphocytes or lymphoblasts is fractionated by this elution procedure and two initial protein peaks are obtained. The first fraction contains more than twice the protein concentration of the second fraction as shown in FIG. 1 of the drawing. Subsequent stepwise increases in the molar concentration of the eluant produce three additional small peaks which contain a mixture of fraction 2, equine-T and some $\beta$-globulin. The addition of the final eluant, 0.05 molar $Na_2HPO_4-NaH_2PO_4$, pH 7.5, with 0.2 molar sodium chloride, results in a breakthrough of protein which contains the remaining $\beta$-globulin and some of the $\alpha$-globulin.

In accordance with this procedure, 25 ml. of horse anti-human serum from horses immunized with spleen cells, 5 to $20 \times 10^9$ cells for 8 weeks, is layered on a column of the equilibrated DEAE-Sephadex, 35 × 3 cm. and the elution is carried out as shown in FIG. 1. The yield of fraction 1 protein is 40 mg. and that of fraction 2 is 10 mg.

Discriminating analytical procedures are as follows

ANTI-INFLAMMATORY CHARACTERISTIC

The rat hind paw edema test is used: Winter et al., Proc. Soc. Exp. Biol. and Med., 111:544 (1962). Typically, fraction 1 is relatively free of this characteristic, providing 0 to 50 percent inhibition of edema at a dosage of 32 mg. per rat. Contrariwise, fraction 2 is more potent, typically providing 30 to 60 percent inhibition of edema at a dosage of 8 mg. per rat. Finney, Statistical Methods in Biological Assay, Hafner, New York, N.Y. (1964).

IMMUNOSUPPRESSIVE CHARACTERISTICS

Fraction 1 is 20 to 40 percent more active than fraction 2. Dose is 80 mg. given during 10 days from day prior to 8 days after grafting.

Ventral abdominal full-thickness skin grafts obtained from female rats are placed on the lateral thoracic aspect of female 120–180 Gm. rats. The grafting technique is performed according to the method of Billingham, "Free Skin Grafting in Mammals" in *Transplantation of Tissues and Cells*, R. E. Billingham and W. K. Silvers (Eds.), Wistar Institute Press, Philadelphia, pp. 1–26 (1961). To prevent trauma to the grafts, each animal is caged individually, and the casts are not removed until the 11th day. Median survival of the grafts is determined as follows: The observed graft survival values do not have a normal bell-shaped distribution, as a small percentage of the rats has an abnormally long rejection time, which skews the distribution. However, a normal bell-shaped distribution is obtained by plotting the logarithm of the graft survival (number of days survival after cast removal). A plot of the normal equivalent deviate against the transformed data is linear. The antilogarithm of the mean of this new distribution is, therefore, an estimate of the median of the original distribution. With the normal distribution, standard statistical analyses are performed. It should be noted that the median values obtained are significantly less than those obtained with usual methods in which the mean survival values of the original distribution are given with calculated standard deviations. Significant differences between groups are determined by the Least Significant Difference Criteria test and between the treated groups and the normal serum controls by the method of Rank Sums. The control group includes the pooled data from eight rats treated with normal horse serum and eight rats treated with a horse anti-rabbit thoracic duct lymphocyte serum. There is no significant difference in the skin graft survivals between these two groups.

IMMUNOELECTROPHORESIS

Immunoelectrophoresis is performed on all concentrated fractions (10 mg./ml.) using a Beckman microzone electrophoresis system. Cellulose acetate is used as the supportive media and a 0.5 microliter sample is electrophoresed for 50 minutes at 250 volts. One lateral trough is subsequently filled with rabbit anti-horse gamma globulin and the other with rabbit anti-horse serum. Diffusion is allowed to develop during 12 hours and the precipitin lines are stained.

Figure 2:
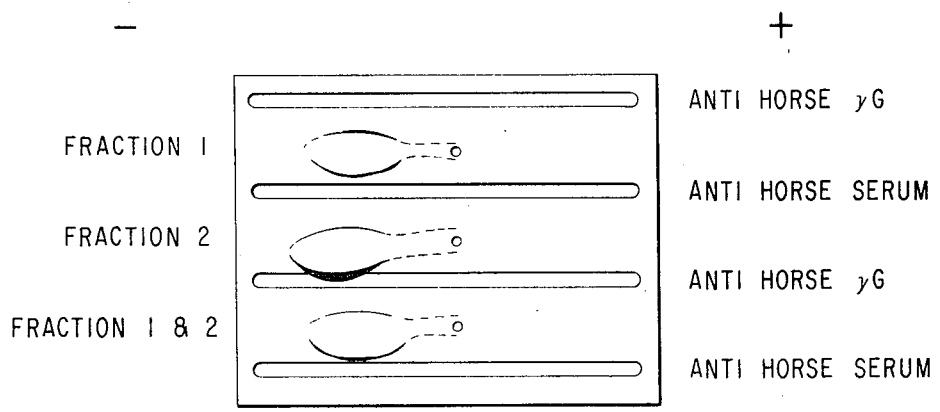
FIG. 2 shows the arcs obtained by immunoelectrophoresis of fractions 1 and 2.

Fractions 1 and 2 react in the gamma region with rabbit anti-horse gamma globulin and rabbit anti-horse serum. Fraction 1 migrates closer to the cathode (gamma 2 region) and fraction 2 migrates more towards the anode (gamma 1 region). When fraction 1 and fraction 2 are mixed (5 mg./ml. of each), only a single arc is produced which migrates in a position midway between the individual fractions 1 and 2. All of the arcs are homogeneous. See FIG. 2 of the drawing.

ACRYLAMIDE GEL ELECTROPHORESIS

Electrophoresis is performed for 2.5 hours at 200 volts on 4 percent acrylamide gel equilibrated with 6 M urea and 0.15 M tris buffer, pH 9.3. Patterns are stained with anazolene sodium (coomassie blue) and the patterns are photographed.

Each fraction produces only a single fairly diffuse band. The mobility of the fractions is measured from the origin to the center of the band. Fraction 1 has a mobility of $3.3 \times 10^{-7}$ cm./volt/sec. and fraction 2, $6.6 \times 10^{-7}$ cm./volt/sec.

ULTRACENTRIFUGATION

Ultracentrifugation is performed on the purified fractions (concentration of 10 mg./ml.) which are dialyzed against an aqueous phosphate buffer 0.01 molar $KH_2PO_4$—$K_2HPO_4$, pH 7.0. $S_{20,w}$ values are determined on each sample. Centrifugation is performed at 50,740×g at 20° C. Diaphragm angle is 40° and photographs are taken at 8 minute intervals.

Fractions 1 and 2 both produce a single narrow homogeneous schlieren pattern during ultracentrifugation. Satellite peaks are not detected indicating the absence of contamination. The $S_{20,w}$ value of fraction 1 is $6.43 \pm 0.25$ and of fraction 2 is $6.46 \pm 0.27$.

DOUBLE DIFFUSION IN AGAR

Six hundred micrograms of each fraction is emulsified in equal volumes of Freund's complete adjuvant and injected into the footpads of 150 gm. female rats. The rats are bled in 10 days and the serum removed. Three rats are used for producing antisera to each fraction. One rat in each group receives a booster injection identical to that given for the primary immunization and is bled 10 days following the booster. The following reagents are used in the Ouchterlony analysis of antigenic determinants on the injected fractions: whole serum obtained from non-immunized horses, electrophoretically pure gamma globulin fractions, anti-horse serum (Hyland Laboratories), anti-horse gamma globulin (Hyland Laboratories). Two percent agarose diffusion plates are utilized. Diffusion is allowed to proceed for 48 hours and the developed patterns are photographed. This technique performed as described has been recently shown to result in the production by the rats of antibody directed only to class-specific determinants on the injected immunoglobulin.

Antisera directed against fraction 1 and that directed against fraction 2 form a line of identity when each is reacted against horse serum. Spur formation, which would indicate antigenic differences, does not develop. A similar line of identity is obtained when antisera directed against fraction 1 is reacted against purified fraction 1 and 2. A similar pattern develops when antisera directed against fraction 2 are substituted for fraction 1 antisera. From these results in six rats immunized by the described methods (either one or two injections), major antigenic differences are not detected in these two fractions.

CYTOTOXICITY

Human lymphocytes are obtained in pure form from peripheral blood by layering diluted (1:4) human blood over a Ficoll-Isopaque gradient, and centrifuging at 400×g for 25 minutes. Ninety to 95 percent of the lymphocytes and platelets settle in a discrete band above the sedimented erythrocytes and granulocytes. The lymphocyte layer is removed and contaminating platelets are separated by sequential washing with Hanks' balanced salt solution containing heparin.

Serial dilutions of fractions and whole sera at an initial concentration of 10 mg./ml. are made in 8 × 75/mm serological test tubes. Human peripheral lymphocytes pooled from two to three donors are suspended in Hanks' solution at a concentration of $1 \times 10^6$/ml. and one drop of cells (50,000) is placed in each tube followed by one drop of 5 percent fetal calf serum which is diluted in Hanks' solution. The tubes are then incubated for 30 minutes at 37° C. and one drop of a 1:2 solution of rabbit complement (Hyland Laboratories) is added. Following an additional 45 minute incubation at 37° C., the tubes are lightly centrifuged for 30 seconds at 400 g, the supernate removed and the cell drop placed on a microscope slide. One drop of isotonic eosin trypan blue dye mixture is added, the drops mixed, covered with a cover glass, and examined microscopically. Dead cells are permeable to dye and stain purple, whereas viable cells exclude the dye. One hundred cells of each solution are counted and the results expressed as the percent dead. Appropriate cell and complement controls are employed and assays are performed in duplicate and on different occasions with cells from different human donors' pools. Titers are expressed as the reciprocal of the last dilution which had more non-viable cells than controls. If control tubes contain more than 10 percent dead cells, the test is discarded.

The cytotoxic titer of one sample of horse anti-human spleen cell serum and one sample of horse anti-human lymphoblast serum and of fraction 1 and fraction 2 components of these sera are listed below. The numerals designated with a plus or negative sign represent the means of two to three separate assays from different aliquots of the preparations. The last dilution of whole sera which has activity is designated zero. When a fraction has activity one dilution higher than whole sera, it is designated as (+1), two dilutions (+2), etc. If the activity of the fraction is less than whole sera, it is designated minus one (−1), minus two (−2), etc. As can be noted, fraction 1 has a 1–2 doubling dilution higher titer than whole sera and conversely fraction 2 has a 1–2 dilution lower titer than whole sera. When the fractions are compared, fraction 1 had 2–4 dilutions greater activity than fraction 2. This pattern is similar for the two types of HALS. We therefore conclude that fraction 1 contains the major cyctotoxic activity of both sera and fraction 2 has a minor, although significant, amount of this antibody. It is also noted that purified fraction 1 contains more activity than whole sera. Mixtures of fraction 1 and 2 in equal proportions in the same concentration (10 mg./ml.) as each of the separate fractions have the same cytotoxic titer as fraction 1 and no additive effect is observed.

The aqueous gamma globulin solution in the form of a serum is added to the pH 7.2 equilibrated anion exchanger in a ratio of 1 ml. of serum to one-half gm. of the suction filtered exchanger. The mixture is agitated gently for about 60 minutes at the temperature at about 4° C. The mixture is filtered and the Sephadex portion is reserved for further working. The filtrate is treated with another like portion of the pH 7.2 equilibrated Sephadex, with gentle agitation for approximately 60 minutes at about 4° C. This suspension is filtered and the Sephadex portion is added to the first reserved portion. The filtrate is re-exposed to additional portions of pH 7.2 equilibrated Sephadex, usually two or three times until tests indicate the presence of pure gamma globulin in the filtrates. The filtrates are combined and centrifuged at about 17,000×g for about 15 minutes with the temperature at about 4° C. The precipitates are discarded. The supernatant contains purified gamma globulin fraction 1.

The various portions of reserved Sephadex are combined and mixed with aqueous phosphate solution, 0.03 molar $Na_2HPO_4$—$NaH_2PO_4$, pH 7.85. An amount of the phosphate solution equal to three times the original volume of serum used is utilized. The suspension is well agitated at about 4° C. for 60 minutes and filtered. The filtrate is again treated with pH 7.6 equilibrated exchanger as above-prepared. Treatments with this Sephadex are repeated until assay of the filtrates shows pure gamma globulin, which is fraction 2. The various filtrates are combined and centrifuged from insolubles at 17,000×g 4° C. for fifty minutes. The aqueous solution thus obtained contains the purified gamma globulin, fraction 2. By

HORSE ANTI-HUMAN LYMPHOCYTE PREPARATION

| Assay | Spleen induced | | | Lymphoblast induced | | |
|---|---|---|---|---|---|---|
| | Fraction 1 [1] | Fraction 2 | Serum | Fraction 1 | Fraction 2 | Serum |
| Cytotoxicity | [2] +1  [3] (256) | [2] −1  [3] (64) | [3] (128) | [2] +2  [3] (4,096) | [2] −2  [3] (256) | [3] (1,024) |

[1] All fractions tested at 10 mg./ml.
[2] Number of doubling dilution higher (+) or lower (−) than whole serum (mean of 2–3 separate experiments).
[3] Reciprocal of the titre of 1 representative sample.

To identify specificity of fractions 1 and 2 from other sources, lymphocytes from the possible source species are used as target cells in the above assay. Such lymphocytes are tested against two-fold dilutions of the said fractions 1 and 2. For example, in the case of differentiating horse anti-human source fractions from horse anti-rat source fractions the dilution at which the human lymphocytes are killed will be higher for the rat generated fractions than for the human generated fractions. This assay is supplemented as required by the rosette inhibiting assay in the horse anti-human system. Bach et al., Transplantation Proceedings, Vol. 1, No. 1, Part 11, 403 (March) 1969.

BATCH PURIFICATION

A batch purification technique is used as an alternative to column chromatography. The gamma globulin starting material, e.g. in the form of horse anti-heterologous lymphocyte serum is dialyzed against 100 volumes of aqueous phosphate buffer, 0.01 molar $Na_2HPO_4$—$NaH_2PO_4$, pH 7.5 with two changes of the buffer.

Five liters of the aqueous phosphate solution, pH 7.5 is added to 500 gm. of DEAE-Sephadex (A-50 coarse) and the mixture is allowed to equilibrate for about 48 hours. During this time the buffer is replaced with fresh 5-liter portions of phosphate solution three times. The final pH of the material is 7.2. Suction filtration yields a semi-hydrated suitable exchanger.

A like procedure is used to equilibrate 500 gm. of the anion exchanger with 0.03 molar aqueous phosphate solution, 0.03 molar $NaH_2PO_4$—$Na_2HPO_4$, pH 7.85. In this instance the pH of the final material is 7.6. Suction drying of the exchanger as a filter bed results in a semi-hydrated anion exchanger product. This equilibrated exchanger is used to obtain fraction 2.

this process (375 ml. of horse anti-rat serum) 750 mg. of fraction 1 and a like amount of fraction 2 are obtained.

From the so-prepared aqueous solutions of purified gamma globulin, fraction 1 and 2, the respective fractions are obtained as dry solids or powders, for example, by freezing the solution and drying the frozen material in vacuo as in freeze-drying.

Similar fractions 1 and 2 are likewise prepared from additional horse gamma globulins, for example, immune sera from horses treated with heterologous lymphocytes from spleen or lymph, lymphoblasts, lymph node cells, soluble lymphocyte or thymus antigen, thymosin, and thymus cells.

I claim:
1. A process for separating fractions of horse gamma globulin of antiheterologous lymphoid cells, or antigen origin consisting essentially of
   1. Equilibrating said globulin against pH 7.5 0.01 molar phosphate buffer
   2. Chromatographing said equilibrated globulin on a column of diethylaminoethyl ether of cross-linked dextran
   3. Eluting a first fraction from said column with pH 7.5 0.01 molar phosphate buffer in accordance with absorbencies at 280 μ and recovering said fraction from the eluates, and
   4. Eluting a second fraction from said column with pH 7.85 0.03 molar phosphate buffer in accordance with absorbencies at 280 μ and recovering said fraction from the eluates.

2. The process of claim 1 wherein the gamma globulin is raised in horses against human lymphocytes or lymphoblasts.

3. The process of claim 1 wherein the gamma globulin is in the form of serum.

* * * * *